Jan. 14, 1958
H. J. LOVEGROVE
2,820,218
THERMALLY SENSITIVE DETECTING ARRANGEMENTS
Filed Sept. 15, 1955
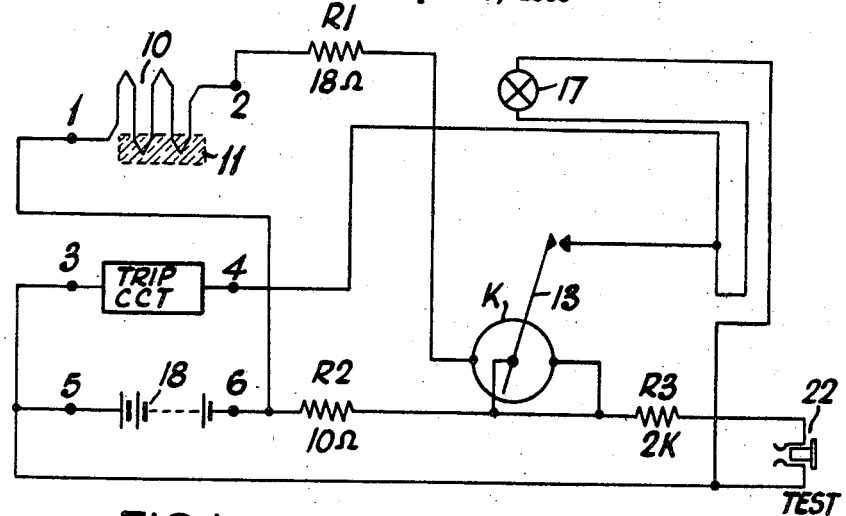
FIG.1.
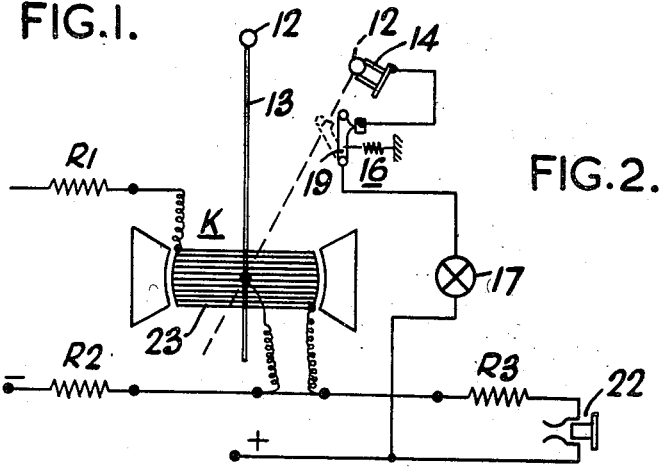
FIG.2.
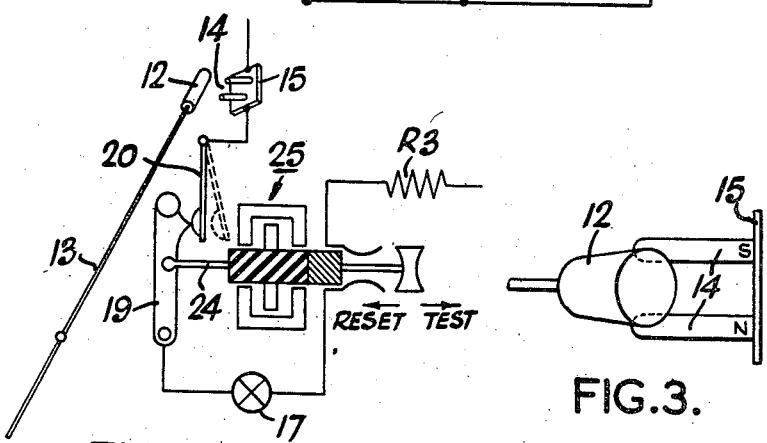
FIG.4.
FIG.3.
INVENTOR:
HENRY JOSEPH LOVEGROVE
BY Rudolph Hurick
ATTORNEY United States Patent Office
2,820,218
Patented Jan. 14, 1958

2,820,218

THERMALLY SENSITIVE DETECTING ARRANGEMENTS

Henry Joseph Lovegrove, Hadley Wood, Barnet, England, assignor to Weston Electrical Instrument Corporation, Newark, N. J., a corporation of New Jersey Application September 15, 1955, Serial No. 534,504

Claims priority, application Great Britain October 22, 1954

2 Claims. (Cl. 340—227)

The present invention relates to thermally sensitive detecting arrangements, particularly fire detectors, suitable for use in aircraft engines but adaptable also to other uses.

An object of the present invention is to provide a detecting arrangement having high sensitivity and rapid response to high rates of temperature change whilst being able to withstand the high ambient temperatures and severe vibration conditions existing in aircraft engines and similar situations.

According to the present invention a thermally sensitive detecting arrangement comprises a thermocouple assembly, a sensitive moving coil instrument relay, which is energized in response to the output of the thermocouple assembly and having contacts of the magnetic hold-on type for controlling a separately energised safety circuit, said safety circuit including a warning device which remains energised until the said relay contacts are separated. In order that the output of the thermocouple shall be dependent almost entirely on the rate of change of temperature rather than the actual temperature, the cold junction of the thermocouple assembly is thermally lagged.

A further feature of the invention consists in a particularly convenient construction of an instrument relay contact for counteracting the effects of severe vibration, wherein the relay contacts are adapted to interengage mechanically under magnetic attraction. For this purpose the moving contact carried by the pointer may comprise a small soft iron slug and the fixed contact may comprise a pair of permanent magnets, preferably of cylindrical or tubular form, having a pair of respective opposite poles spaced apart so that the soft iron member carried by the pointer may engage between the said two poles when coming within the sphere of attraction of the said poles.

One typical embodiment of the invention will now be described in more detail as applied to a fire detection device suitable for use on aircraft engines.

Fig. 1 is a simplified schematic circuit of a fire detection device;

Fig. 2 is a diagram showing in more detail one arrangement of the relay contacts and a resetting device therefor;

Fig. 3 is an enlarged diagram of a further arrangement of relay contacts;

Fig. 4 is a purely functional diagram of a 3-position continuity tester and relay resetting device.

Referring now to the drawings, 10 represents an assembly of a convenient number of thermocouples, for example an arrangement of four rings each comprising four thermocouples connected in series, placed at convenient positions on the aircraft engine. The respective cold junctions of the various thermocouples in the assembly are thermally lagged with suitable insulation indicated by 11, whilst the series of opposite (hot) junctions are unlagged and are therefore able to respond to rapid changes of the ambient temperature. Since each couple has both a hot and a cold junction, connection between the couples and to the terminals 1 and 2 require no special compensating cables and may be made with copper wire. The thermocouples are made of heat resisting material and are designed to withstand flame temperatures of a high order, for example up to at least 1000° C. Under normal conditions the lagged and unlagged junctions are at approximately equal temperatures, but upon an abnormally rapid rise in temperature, such as would occur in a fire, the thermocouple assembly is designed to provide a sufficient output to operate the circuit now to be described and to give a warning in less than 2 seconds.

Terminal 2 of the thermocouples assembly is connected through a suitable resistance $R_1$ to one terminal of the moving coil of a sensitive moving coil type relay K, whilst the terminal 1 of the thermocouples assembly is connected to the negative terminal 6, of a 24 volts battery 18, and through a second resistance $R_2$ to the second terminal of the moving coil relay. The contacts of the relay are indicated in more detail in Fig. 2, and an alternative arrangement is shown in Fig. 3. The moving contact consisting of a small silver plated soft iron slug 12 is carried at the end of the moving pointer 13 and is also connected effectively to the above mentioned second terminal of the moving coil instrument. The fixed contact assembly of the relay consists of a pair of silver plated round nosed rod magnets 14 mounted substantially in parallel relation. One pair of opposite poles are secured and electrically connected to a fixed contact bar 15 mounted on the instrument. The opposite pair of unlike poles have their axes symmetrically spaced on either side of the arc of movement of the soft iron moving contact. The fixed contact bar 15 is electrically connected, preferably through a suitable manually operated resetting device 16, which may be operated by a push button, for releasing the contacts to one terminal of a low power warning lamp 17, the other terminal of which is connected to the positive pole 5 of the 24 volt battery. The lamp is thereby shunted across the battery in series with the second resistance $R_2$, above referred to, when the relay contacts are closed. One form of resetting device, shown diagrammatically in Figure 2, may comprise the pivoted resetting arm 19 forming the movable contact of a pair of normally closed contacts, the fixed contact of which is connected to the fixed contact assembly 14—15 of the moving coil relay. The resetting arm 19 is biased by a spring into the closed position and is pivoted near to the closed position of the relay pointer so that operation of the resetting arm against the spring first breaks the lamp circuit and then breaks the magnetic contacts 12, 14.

A trip circuit through the terminals 3 and 4, which may comprise a suitable device for initiating the discharge of a fire extinguishing fluid and which may also contain an audible warning device, is also connected in parallel with the warning lamp across the battery through the relay contacts and the second resistance $R_2$ above referred to.

A test button 22 is connected at one side to pole 5 of the battery and at the other side, through a suitable high dropping resistance $R_3$ to the second terminal of the moving coil 23 of the relay.

The operation of the arrangement is as follows. Normally there is no E. M. F. across the terminals of the thermocouple assembly and hence no E. M. F. across the coil 23 of the relay. Upon a sudden increase in engine temperature in the region of the unlagged thermocouple junctions the output of the thermocouple assembly is applied via the first and second resistances $R_1$ and $R_2$ to the moving coil of the relay.

The pointer 13 deflects and the moving contact 12 is pulled in and held on by the fixed permanent magnet contacts. Owing to the shape of the contacts, they are not separated by the vibration of the engine. The warning lamp 17 and the trip circuit in shunt therewith are connected directly across the battery through the second resistance above referred to. If the trip circuit contains a fire extinguisher actuating device, the latter may be arranged to operate automatically. Alternatively the fire extinguisher may be operable manually by the pilot or engineer, and an audible warning device, set in operation by the trip circuit, may be provided in addition to or in place of a fire extinguisher actuating device. In either case the signal warning lamp 17 and the audible warning device, if fitted, remain energised until the relay contacts are positively seperated by the manual resetting device 16 provided for that purpose. When the reset button is pressed the moving coil is returned to its free zero position provided that there is no longer any output from the thermocouple.

When it is desired to test the circuit for continuity the test button 22 is depressed, thus applying the battery voltage to the thermocouple assembly through the moving coil of the relay and the resistors $R_1$ and $R_3$. If the thermocouple or the associated wiring is open circuited or shows high resistance the relay contacts will not close. On the other hand if the circuit is normal the contacts will close and will energise the warning lamp.

A more compact arrangement in which the test button and resetting device are combined in a three position switch is indicated diagrammatically in Fig. 4. The push bar 24 of the switch 25 is arranged to actuate the resetting arm when placed in the forward (reset) position and to make the circuit through the thermocouples and the relay, as above described when placed in the reverse (test) position. In the latter position the contact strip 20 flexes as indicated to keep the circuit closed through the resetting arm 19. Thus construction provides a convenient means of resetting the relay and then testing the thermocouples with one control. In either of the constructions shown, however, a warning signal will persist until manually cleared by the resetting device and will reappear if the high temperature condition at the engine still exists.

It will be seen that when the test button 22 is depressed, or when the three position test and reset switch of Fig. 4 is placed in the testing position, and if the relay contacts are broken which will normally be the case, a circuit is then made from the battery through the trip circuit and lamp 17 and resistors $R_3$ and $R_2$ in series, but due to the high resistance of $R_3$ the small current is insufficient to test the lamp. $R_3$ thus avoids a spurious test indication before closure of the relay contacts. Only when these contacts have been closed, can the lamp 17 give the test indication.

The trip circuit and warning lamp are arranged to operate satisfactorily over a range of voltage corresponding at least to that delivered by the aircraft D. C. generating installation e. g. 18 to 30 volts. Each engine is provided with the requisite number of series-connected couples controlling its individual detector circuit and relay, and these themocouples may be distributed in such a manner that adequate protection is obtained over the possible fire region.

The detector relay may have various types of release for the permanent magnet contacts. Also auxiliary spring tensioned releasing means, may be provided if desired, for example as disclosed in British patent specification No. 572,754.

I claim:

1. A temperature-sensitive detecting arrangement comprising a thermocouple assembly, a moving coil instrument relay connected to the said thermocouple assembly so as to be energized by the output thereof, magnetic means for completing closure of the relay contacts, and manually operable means comprising a testing switch incorporated in a three-position resetting and testing device having a test position, a relay resetting position and an inoperative position for resetting said relay contacts without breaking the circuit through the thermocouple and relay coil, a testing circuit comprising a source of continuous voltage, and a voltage dropping resistor connected in parallel across the thermocouple assembly and the relay moving coil, said testing device, when operated, injecting a test voltage from said source into the thermocouple assembly and the relay moving coil, and a warning device connected to the voltage source through the relay contacts so as to be energized from the said source either when the relay contacts are closed due to a generation of an electromotive force by the thermocouple assembly or due to the injection of said test voltage through the thermocouple assembly and the moving coil, said relay contacts in each case being held on by the magnetic closing means until manually opened by the three-position device.

2. A temperature-sensitive detecting arrangement comprising a thermocouple assembly, a relay connected to said assembly so as to be energized by the output thereof, means for completing closure of the relay contacts, a manually operable three-position resetting and testing device having a test position, a resetting position and an inoperative position, and a source of continuous voltage for said arrangement connected in circuit with said thermocouple assembly and a moving coil of said relay, said three-position device, when operated to one position, injecting a test voltage from said source into the thermocouple assembly, and when operated to another position, resetting said relay.

References Cited in the file of this patent

UNITED STATES PATENTS

| 2,449,304 | Lamb | Sept. 14, 1948 |
| 2,473,940 | Clark | June 21, 1949 |
| 2,580,810 | Mathis | Jan. 1, 1952 |
| 2,589,869 | Ruffle | Mar. 18, 1952 |
| 2,731,627 | Herbst | Jan. 17, 1956 |
| 2,742,634 | Bergen et al. | Apr. 17, 1956 |